UNITED STATES PATENT OFFICE.

FRANZ GUSTAV KLEINSTEUBER, OF BERLIN, GERMANY.

METHOD OF DISSOLVING RESINS.

SPECIFICATION forming part of Letters Patent No. 654,646, dated July 31, 1900.

Application filed November 9, 1899. Serial No. 736,403. (No specimens.)

*To all whom it may concern:*

Be it known that I, FRANZ GUSTAV KLEINSTEUBER, a subject of the Grand Duke of Saxe-Weimar, residing at Pankow, Berlin, Germany, have invented certain new and useful Improvements in Methods of Dissolving Resins; and I do hereby declare the following to be a full, clear, and exact description of the invention, such as will enable others skilled in the art to which it appertains to make and use the same.

In the manufacture from resins of a plastic material adapted to be molded or otherwise shaped to any desired form which will harden on drying it is of course necessary to dissolve the resinous material. It is well known that by means of the solvents generally employed many species of resins can only be incompletely dissolved, and this with great difficulty—as, for instance, the copals—yet these very resins are particularly well adapted for the manufacture of the material referred to owing to their peculiar character and specific properties.

My invention has for its object a method or process whereby the difficulties referred to are obviated and a complete solution of the resin readily effected while the quality of the final product is materially enhanced. To these ends, I add to the resin solvent usually employed or a solution of resin a suitable quantity of a compound which in conjunction with said solvent readily and completely dissolves the resin and imparts to the final product properties not possessed by similar products as heretofore manufactured.

In carrying out my invention I prepare a compound consisting of a solution of dammar and tung or wood oil in benzole and oil of turpentine, and of this I add to the resin solvent or to the resin solution a quantity equal to from two to ten per cent. of the resin, according to the nature thereof. The properties of this compound may be materially enhanced by the addition to the compound of oil of rosemary.

In practice I preferably prepare the compound as follows: I dissolve, say, three parts of dammar in five parts of oil of turpentine. I then mix fifty parts of tung or wood oil, twenty-three parts of benzole, and five parts of oil of turpentine and mix the same with the solution of dammar, and a suitable quantity of this compound in about the proportions above stated is mixed with the resin solvent—as benzole, alcohol, oil of turpentine, or the like—and to this I add the resin to be dissolved and heat the mixture, while stirring the same, to a temperature of from 40° to 50° centigrade until the solution is completed, and, as above stated, I may and in fact I prefer to add to the compound of dammar, tung-oil, benzole, and oil of turpentine above given about two parts of oil of rosemary. This, however, I prefer to add after the mixture has been brought to the temperature referred to, though it may be added before or at any stage before the composition has thickened. Furthermore, and as heretofore stated, I may first prepare a solution of the resin in any usual solvent, so far as this can be done, and then add thereto a suitable quantity of the compound and proceed as above described.

If a filler—such as asbestos, mica, or the like—is to be mixed with the material, the compound may be added to the resin solution after the admixture therewith of such filler or before, as may be desired.

It will be understood that I do not limit myself to the exact proportions of the compounds of dammar, tung or wood oil, oil of turpentine, and oil of rosemary, as these may be varied within certain limits, though I have found that the proportions given produce excellent results. I have also found that if the composition of matter obtained as above described is allowed to stand from twenty-four to forty-eight hours a better final product is obtained.

By the process described the slimy constituents of the resins, which are of the greatest importance to the final product, are completely dissolved and become intimately incorporated in the mass, and, as will be readily understood, the manufacture of materials such as referred to from resins is greatly facilitated and expedited, while the final product is superior in every respect to like products as heretofore made in that the compound added to the resin solvent or resin solution not only results in the complete dissolution of the same, but in that a more homogeneous, tough, and solid product is obtained, the brittleness of which is reduced to a minimum, while the physical properties of the tung or wood oil, irrespective of its great superiority to linseed-oil as a dryer, have a very material influence on the final product, so that the latter is especially adapted to the manufacture of bodies or objects subjected to shock or jarring, and hence to the use of such final products as electrotechnical insulations.

I do not claim herein the product of the described process, as this forms the subject-matter of a divisional application.

Having thus described my invention, what I claim as new therein, and desire to secure by Letters Patent, is—

1. The mode of dissolving resins, which consists in mixing with the resin solvent a suitable quantity of a compound consisting of a solution of dammar and tung or wood oil in benzole and oil of turpentine, and dissolving the resin therein, substantially as set forth.

2. The mode of dissolving resins, which consists in mixing with the resin solvent a suitable quantity of a compound consisting of a solution of dammar and tung or wood oil in benzole, oil of turpentine and oil of rosemary, and dissolving the resin therein, substantially as set forth.

3. The mode of dissolving resins, which consists in forming a solution thereof in the usual manner, mixing therewith a suitable quantity of a compound consisting of a solution of dammar and tung or wood oil in benzole and oil of turpentine, and heating the mixture to from 40° to 50° centigrade while stirring, substantially as set forth.

4. The mode of dissolving resins, which consists in forming a solution of such in the usual manner, mixing therewith a suitable quantity of a compound consisting of a solution of dammar and tung or wood oil in benzole and oil of turpentine, heating the mixture to from 40° to 50° centigrade while stirring and adding thereto a suitable quantity of oil of rosemary, substantially as set forth.

In testimony that I claim the foregoing as my invention I have signed my name in presence of two subscribing witnesses.

FRANZ GUSTAV KLEINSTEUBER.

Witnesses:
WOLDEMAR HAUPT,
HENRY HASPER.